(12) United States Patent
Suntio

(10) Patent No.: US 6,262,900 B1
(45) Date of Patent: Jul. 17, 2001

(54) MODULAR POWER SUPPLY SYSTEM WITH CONTROL COMMAND VERIFICATION

(75) Inventor: Teuvo Suntio, Klaukkala (FI)

(73) Assignee: Muuntolaite Oy, Vantaa (FI)

( * ) Notice: Subject to any disclaimer, the term of this patent is extended or adjusted under 35 U.S.C. 154(b) by 0 days.

(21) Appl. No.: 09/700,978
(22) PCT Filed: May 21, 1999
(86) PCT No.: PCT/FI99/00440
  § 371 Date: Jan. 19, 2001
  § 102(e) Date: Jan. 19, 2001
(87) PCT Pub. No.: WO99/62160
  PCT Pub. Date: Dec. 2, 1999

(30) Foreign Application Priority Data

May 22, 1998 (FI) .................................................. 981138

(51) Int. Cl.⁷ .................................................. H02M 7/02
(52) U.S. Cl. .................................................. 363/69; 363/70
(58) Field of Search .................................. 363/65, 67, 69, 363/70

(56) References Cited

U.S. PATENT DOCUMENTS

| | | | |
|---|---|---|---|
| 4,441,032 | * 4/1984 | Sakurai et al. ......................... | 363/69 |
| 4,451,773 | * 5/1984 | Papathomas et al. .................. | 363/69 |
| 4,633,412 | * 12/1986 | Ebert et al. ............................. | 363/69 |
| 4,766,364 | 8/1988 | Biamone et al. ....................... | 363/65 |
| 5,032,971 | * 7/1991 | Yamada .................................. | 363/70 |
| 5,319,536 | 6/1994 | Malik ..................................... | 363/65 |
| 5,428,523 | 6/1995 | McDonnal .............................. | 363/71 |
| 5,479,335 | 12/1995 | Saito et al. ............................. | 363/65 |
| 5,712,779 | * 1/1998 | Sheppard et al. ...................... | 363/69 |
| 5,740,023 | 4/1998 | Brooke et al. ......................... | 363/65 |

\* cited by examiner

*Primary Examiner*—Jeffrey Sterrett
(74) *Attorney, Agent, or Firm*—Greenberg Traurig LLP

(57) ABSTRACT

A modular power supply system (200), which comprises at least two power units (101', 102') connected in parallel for producing a certain ouptut voltage (DC) of a certain input voltage (AC), and a control unit (106) for giving control commands concerning the level of the output voltage of the power units to the power units. The control of the power units comprises steps in which: the control unit gives a control command to the power unit; the power unit examines whether the control command received by it meets certain saved criteria, whereby the control command which meets the saved criteria is executed (302, 303), and the control command which does not meet the saved criteria is not executed (301).

8 Claims, 3 Drawing Sheets

MODULAR POWER SUPPLY SYSTEM WITH CONTROL COMMAND VERIFICATION

The invention relates to controlling the operation of power supply systems in general. In particular, the invention relates to controlling the modules of such a modular power supply system, in which a centralized control unit can make the modules operate at different voltage levels by commands.

Figure 1:
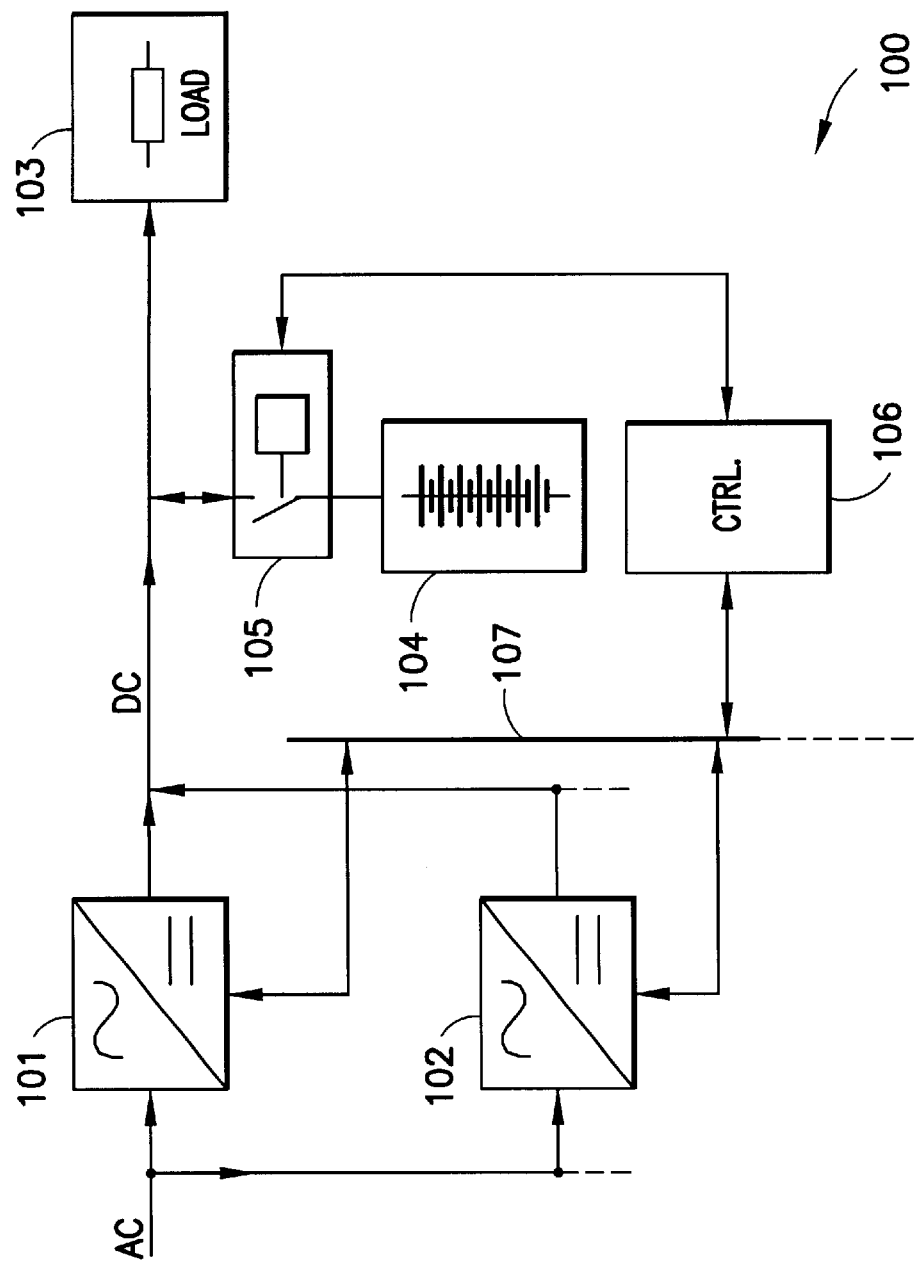

FIG. 1 depicts a prior art modular power supply system 100, which is used to feed battery-backed electric power to the load. The system comprises N parallel power units, of which only 101 and 102 are shown in the figure for clarity. The positive integer N is generally selected such that even if one power unit failed, the performance of the remaining power units would be sufficient to meet the power requirement of the load in normal circumstances. The power units are rectifier and control units, the inputs of which are connected to alternating current (AC), which is generally a common electricity distribution network. The outputs of the power units are connected to the load 103. The power units can be called the modules of the system.

In order to ensure uninterrupted power supply, the system includes a storage battery 104, which is connected in parallel with the load by means of the equipment 105, which prevents deep discharge of the battery. The latter is essentially a switch, which cuts the supply of electricity from the storage battery to the load when required, and thus prevents a complete discharge of the storage battery in a situation in which the power units have been unoperational for some time, and the charge of the battery has been mostly discharged to the load. The operation of the system is controlled by a control unit 106. In order to implement data transfer between the control unit and power units, the system has a data transfer connection 107, which can be a serial bus, for example. In the following, the data transfer connection between the control unit and the power units is generally called a serial bus, regardless of how the connection has been implemented in a practical embodiment. The data transfer connection between the control unit 106 and the equipment 105 which prevents deep discharge of the battery, can be implemented through the same serial bus or there can be a separate connection for it, which is independent of the serial bus.

Measurements of the condition of the storage battery 104 often require that the battery is discharged at times. For this, the output voltage of the power units 101, 102 is lowered to a so-called support level. After the measurement, the storage battery must be fully charged again, for which the output voltage of the power units 101, 102 is raised back to the permanent charge level or to a somewhat higher quick charge level. Quick charge is used particularly if the discharge of the storage battery has taken a long time. After some time, the output voltage of the power units must be lowered to the permanent charge level in order to prevent the overvoltage from damaging the storage battery or the load. Regulating the output voltage to the support level, permanent charge level or quick charge level takes place so that the control unit 106 gives an output voltage regulation command to each power unit via the serial bus 107. The regulation commands are numeric values or encoded commands, which are converted into numeric values in the power units.

In addition to the centralized output voltage regulation, the system comprises selective overvoltage control, which is implemented separately in each power unit. The selective overvoltage control interrupts the operation of the power unit in question, if the output voltage of the power unit exceeds a certain predetermined overvoltage limit. Selectiveness means that the operation of the power unit is only interrupted if the power unit is loaded in an overvoltage situation, that is, current is detected at its output simultaneously with an output voltage which is higher than the overvoltage limit. The operation of the selective overvoltage control in a certain power unit is not dependent on other power units.

The reliability of a system according to FIG. 1 is substantially weakened by the possibility of a common-mode failure. This means that the operation of at least two power units is disturbed by a common cause simultaneously and in the same way. Generally, the reason for this is that the control unit has given the wrong command, as a result of which the output voltage of all power units is too low or too high and/or it remains at the wrong level for too long a time.

It is an objective of the present invention to provide a method and equipment for controlling the operation of a system comprising power units in such a manner that the probability of a common-mode failure is small. It is also an objective of the invention that the manufacturing costs of the construction are low.

The objectives of the invention are achieved by saving certain criteria in the power units, on the basis of which criteria the power units can determine whether the control command given by the control unit is sensible. The operation of the power units is arranged such that they do not execute a control command which does not meet the saved criteria.

The method according to the invention is characterized in that it comprises steps in which
the control unit gives a control command to the power unit,
the power unit examines whether the control command received by it meets certain predetermined and saved criteria, whereby
   a control command which meets the saved criteria is executed, and
   a control command which does not meet the saved criteria is not carried out.

The invention also relates to a modular power supply system, which is characterized in that it comprises means in each power unit for saving criteria that determine the rationality of the control commands, and means for comparing the received control command to the saved criteria.

According to the invention, the operation of a modular power supply system comprises a configuration mode and an operation mode. In the configuration mode, certain criteria are saved in each power unit, by means of which criteria the power unit can determine whether the control command received by it is sensible. The saving is called the configuration of the power sources, and it is carried out in a situation in which it is clearly known what each command given by a control unit means and what each value contained in the command refers to. The configuration can be carried out under the supervision of an electrician, for example. In the operation mode, the power units receive control commands from the control unit in the same way as in the prior art system, but instead of executing the commands without questioning, each power unit compares the command received by it to the criteria saved in connection with the configuration and executes only the commands which are sensible as compared to the criteria.

Suitable criteria include the numeric value of the level of each output voltage (permanent charge level, support level, quick charge level etc.) and the duration of an output voltage level which differs from the permanent charge level. The power unit checks whether the output voltage level referred to by the control command meets the level of the criterion, and for how long the command referring to an output level voltage which differs from the permanent charge level has been in force. If the output voltage level referred to by the control command contradicts the saved criteria, or if an output voltage level which differs from the permanent charge level has continued longer than the criterion allows, the power unit returns its output voltage to the permanent charge level or interrupts its operation.

According to the preferred embodiment of the invention, certain factory settings or limiting values have been fixed in the programmable parts of the power units or at the "hardware" or component level, which factory settings function as criteria for the criteria used by the system. It is not possible for the user to save a criterion which would violate the factory settings of the power supply. The overvoltage protection of the power supply, for example, is a factory setting, whereby it is not possible to save a value higher than the output voltage that triggers the overvoltage protection as the criterion of the quick charge level.

Figure 2:
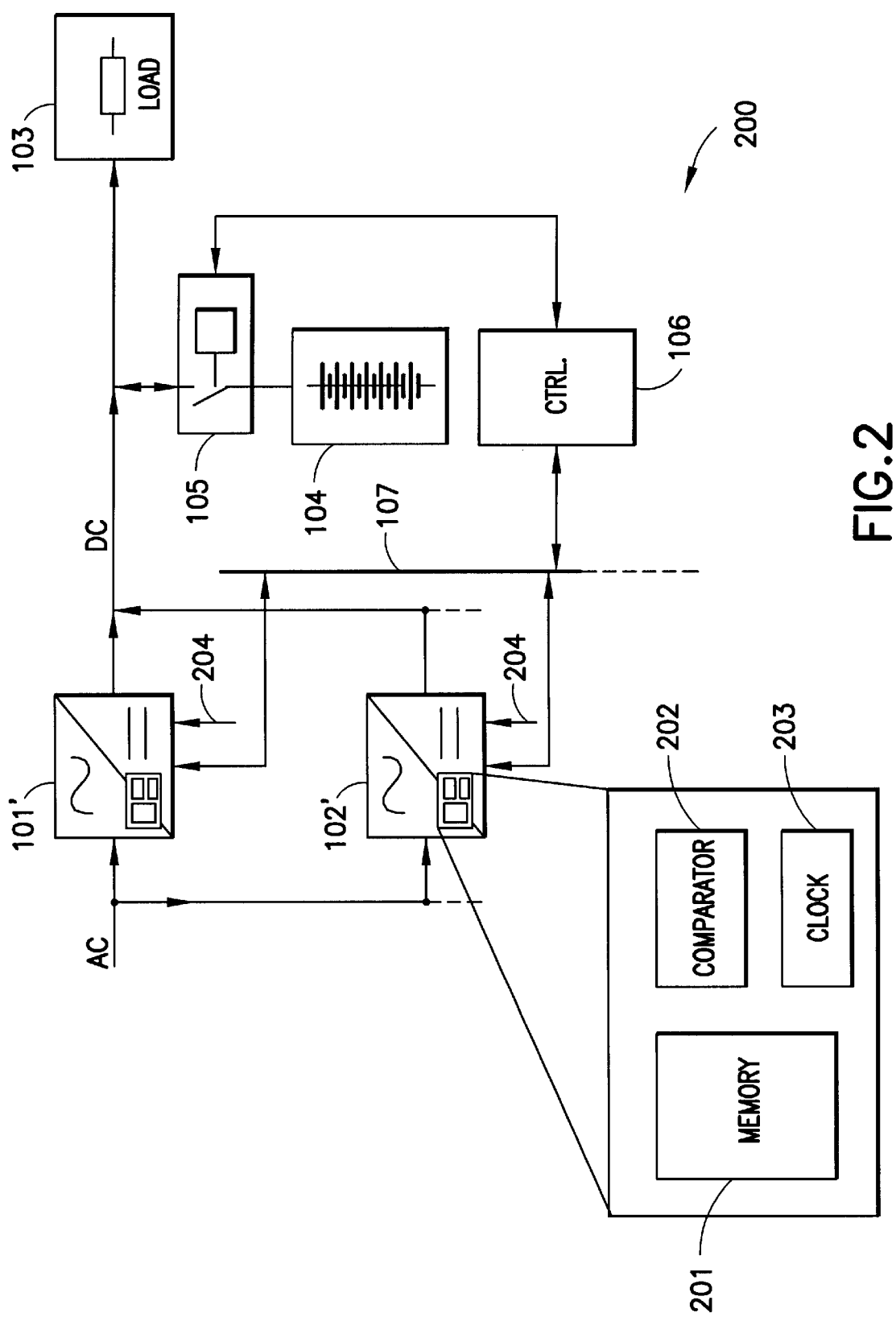
Figure 3:
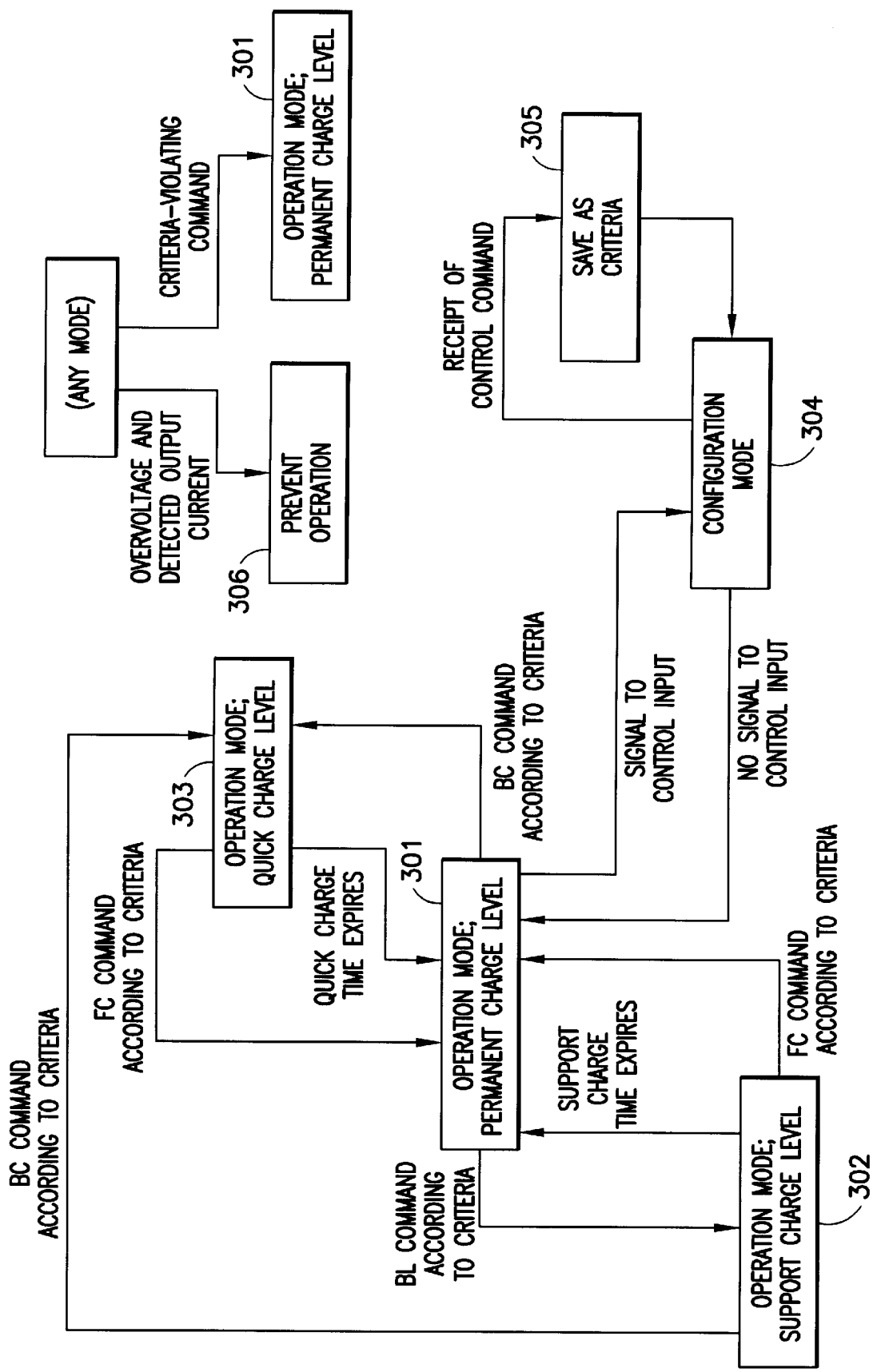

In the following, the invention will be described in more detail with reference to the preferred embodiments shown by way of example and the accompanying drawings, in which FIG. 1 shows a prior art modular power supply system,
FIG. 2 shows a modular power supply system according to the invention, and
FIG. 3 shows a method according to the invention.

In the above description of the prior art reference was made to FIG. 1, and thus in the description of the invention and its preferred embodiments reference will be made mostly to the FIGS. 2 and 3. The same reference numbers are used in the figures for corresponding parts.

FIG. 2 shows a modular power supply system 200, in which the difference to the above prior art system is the fact that each power unit 101', 102' comprises a memory device 201, a comparator 202 and a clock 203. Certain criteria, which concern the acceptability of the control commands can be saved in the memory device 201. The comparator 202 compares the received control command to the criteria and determines whether the control command is in harmony with the criteria. The clock 203 operates in connection with the comparator 202, and it determines for how long the power unit has been at a voltage level which differs from the permanent charge level. In addition, the figure schematically shows the control input 204 at each power unit. By means of a signal brought to this input, the power unit can be set in a so-called configuration mode, which differs from the normal operation mode. The control input need not be a separate input, but the setting in the configuration mode can also be made by means of a command given through the serial bus 107. The configuration mode differs from the normal operation mode so that during it the commands given by the control unit 106 via the serial bus 107 are interpreted as values of the criteria, which are saved in the memory 201, and are not used to change the value of the output voltage of the power unit.

The system according to FIG. 2 operates so that under supervised circumstances, each power unit in turn (or all power units simultaneously) are set in the configuration mode, after which the control unit 106 gives the values of the criteria via the serial bus, and the values are saved in the memory of the power unit being configured. In the following, the permanent charge level of the output voltage is marked with FC, the support charge level by SL and the quick charge level by BC. In addition, the overvoltage limit of the selective overvoltage control is marked with SOV, and the lowest allowed output voltage, which triggers the operation of the equipment which prevents deep discharge of the storage battery, is marked with LVD. It is assumed that the storage battery is a lead battery with 24 cells, and its normal output voltage, which corresponds to a full charge, is 54.00 V. Thus suitable criteria to be saved in the memory of power units during the configuration mode are, for example:

permanent charge marginal: 53.00 V≦FC≦55.00 V
quick charge marginal: FC≦BC≦SOV−2 V
quick charge time: $T_{BC} \leq 24$ h
support charge marginal: LVD+2 V≦SL≦FC
support charge time: $T_{SL} \leq 10$ h Here $T_{BC}$ means the time during which the output voltage of the power unit is at the quick charge level, and $T_{SL}$ means the time during which the output voltage of the power unit is at the support level.

When the configuration has been carried out, the power unit is set to the normal operation mode by releasing the control input 204 or by giving a command which denotes the normal operation mode via the serial bus 107. In the normal operation mode, the power unit receives commands referring to the level of the output voltage from the control unit 106, but instead of executing the received command immediately, it examines by means of the comparator 202 whether the received command is such that it can be executed without violating the saved criteria.

In addition to the criteria saved in the configuration mode, the power supply can contain factory settings, which set limits to the kind of criteria that can be saved in the configuration mode. The factory settings can be saved in the same or a similar memory device as used for saving the criteria, or the component construction of the power supply is such that it cannot apply a criterion which is on the wrong side of the factory setting. The latter alternative is generally described by saying that the factory setting is built in the hardware of the power supply. The factory settings ensure that the power supply cannot be configured wrong. The factory setting can function either so that a criterion which violates the factory setting is not saved at all, or so that the criterion is saved, but if it exceeds the factory setting, the factory setting and not the criterion is applied in the operation mode.

The mode diagram shown in FIG. 3 illustrates the operation of the power supply. The basic mode of operation is 301, in which the power supply operates normally and its output voltage is at the permanent charge level. Transfer to operation at the support charge level 302 takes place as a response to the command according to the criteria received from the control unit, which is called the BL command in the figure. Return to the basic mode 301 takes place either as a response to the FC command according to the criteria or to an observation that the support charge time specified in the criteria is expiring. The latter situation is a sign of an error in the operation of the control unit or serial bus, because when operating correctly, the control unit must return the output voltage of the power units from the support charge level to the permanent charge level (or the quick charge level) before the expiry of the support charge time. The error can be such that the control unit or the serial bus is stuck in a mode which as such corresponds to a BL command which meets the criteria; so as to prevent the power unit from changing immediately back to the mode 302, it can be a good idea to include a timer in the mode 301 to prevent a quick return to the mode from which the change to the mode 301 just took place.

It is also possible and correct to move from the mode 302 directly to the mode 303, in which the output voltage of the power unit is at the quick charge level. A transfer like this takes place in the same way as the transfer from the basic mode 301 to the mode 303, or as a response to the BC command according to the criteria. Return from the mode 303 to the mode 302 corresponds to return from the mode 302 to the mode 301, and thus it can take place as a response to an FC command according to the criteria or to an observation of the expiry of the quick charge time.

Transfer from the basic mode 301 to the configuration mode 304 takes place when the power unit receives a configuration command via the control input (or serial bus). In the configuration mode, reception of the control command does not cause changes in the output voltage but it causes the received control commands to be saved as criteria in accordance with the mode 305. Return from the configuration mode 304 takes place as a response to the removal of the configuration command or to a separate command, which denotes return from the configuration mode to the basic mode.

The upper right part of the FIG. 3 shows the mode transfers, which are possible in all the modes 301 to 305. The reception of a command which violates the criteria causes a transfer to the basic mode 301. In addition, the power unit comprises a selective overvoltage protection, prior art as such, which prevents the operation 306, if the output voltage exceeds a certain limit and current is simultaneously detected at the output of the power supply.

The criteria saved by the power unit can be called variables, which are used particularly in control systems based on fuzzy logic.

What is claimed is:

1. A power supply system (200), which comprises at least two power units connected in parallel (101', 102') for producing a certain output voltage (DC) from a certain input voltage (AC), and a control unit (106) for giving control commands concerning the level of the output voltage, characterized in that it comprises in each power unit means for saving criteria (201) which determine the rationality of the control commands (201), means for comparing (202) a received control command to the saved criteria in order to determine the rationality of said received control command, means for executing a received control command that has been determined as rational through a comparison to the saved criteria and a timer (203) for examining how long a certain control command has been effective in order to enable time-outing the effectiveness of control commands.

2. A power supply system according to claim 1, characterized in that it also comprises a control input (204) in each power unit for setting the power unit to the configuration mode for saving new criteria which determine the rationality of the control commands.

3. A power supply system according to claim 2, characterized in that it comprises a serial bus (107) for transmitting the control commands, to which serial bus the control unit and the power units are connected, and said control input is the same as the connection of the power unit to the serial bus.

4. A power supply system according to claim 2, characterized in that it comprises a serial bus (107) for transmitting the control commands, to which serial bus the control unit and the power units are connected, and said control input is also a separate input (204) in the power unit.

5. A method for controlling the operation of a modular power supply system, which power supply system (200) comprises at least two power units (101', 102') connected in parallel for producing a certain output voltage (DC) from a certain input voltage (AC) and a control unit (106) for giving control commands concerning the level of the output voltage of the power units, characterized in that it comprises steps in which the control unit gives a control command to the power unit, the power unit examines whether the control command received by it meets certain predetermined and saved criteria, whereby a control command which meets the saved criteria is executed (302, 303), and a control command which does not meet the saved criteria is not executed (301); and the power unit uses a timer (203) for examining how long a certain control command has been effective in order to enable time-outing the effectiveness of control commands.

6. A method according to claim 5, characterized in that it also comprises steps in which the power unit is set in the configuration mode (304), a certain new criterion is saved in the power unit, and the power unit is set in the operation mode (301).

7. A method according to claim 5, characterized in that when a control command which does not meet the saved criteria is received, it is not executed but the power unit is set to operate in a certain basic mode (301).

8. A method according to claim 5, characterized in that it also comprises a step in which the operation of the power unit is prevented (306) as a response to a simultaneous observation of overvoltage of the power unit and output current.

\* \* \* \* \*